United States Patent
Ichizaki

(10) Patent No.: US 7,538,459 B2
(45) Date of Patent: May 26, 2009

(54) DISK DRIVE DEVICE HAVING A MOTOR, AND MANUFACTURING METHOD OF THE MOTOR

(75) Inventor: Hiroyuki Ichizaki, Kyoto (JP)

(73) Assignee: Nidec Corporation, Kyoto (JP)

( * ) Notice: Subject to any disclaimer, the term of this patent is extended or adjusted under 35 U.S.C. 154(b) by 215 days.

(21) Appl. No.: 11/610,605

(22) Filed: Dec. 14, 2006

(65) Prior Publication Data

US 2007/0133123 A1 Jun. 14, 2007

(30) Foreign Application Priority Data

Dec. 14, 2005 (JP) ............................. 2005-360483

(51) Int. Cl.
*H02K 11/00* (2006.01)
(52) U.S. Cl. ..................................... 310/67 R; 310/261
(58) Field of Classification Search ......... 310/261–262, 310/67 R, 156.01, 156.12, 156.13, 156.14; 360/99.01, 99.04, 99.07, 99.08
See application file for complete search history.

(56) References Cited

U.S. PATENT DOCUMENTS

| | | | | |
|---|---|---|---|---|
| 5,254,895 A | * | 10/1993 | Koizumi | 310/156.06 |
| 6,069,429 A | * | 5/2000 | Yamamoto et al. | 310/90 |
| 6,084,323 A | * | 7/2000 | Pelstring et al. | 310/67 R |
| 6,339,275 B1 | * | 1/2002 | Katagiri | 310/261 |
| 6,486,578 B2 | * | 11/2002 | Kitahori et al. | 310/67 R |
| 7,015,611 B2 | * | 3/2006 | Tokunaga et al. | 310/90 |
| 7,084,536 B2 | * | 8/2006 | Obata et al. | 310/90 |
| 2001/0013726 A1 | * | 8/2001 | Katagiri et al. | 310/67 R |
| 2003/0031113 A1 | | 2/2003 | Asano | |
| 2004/0061404 A1 | * | 4/2004 | Fujii et al. | 310/216 |

FOREIGN PATENT DOCUMENTS

| | | |
|---|---|---|
| JP | 9-56121 A | 2/1997 |
| JP | 9-154268 A | 6/1997 |
| JP | 2002-288910 A | 10/2002 |
| JP | 2003-61304 A | 2/2003 |

\* cited by examiner

*Primary Examiner*—Thanh Lam
(74) *Attorney, Agent, or Firm*—Keating & Bennett, LLP

(57) ABSTRACT

An inner rotor type motor includes a turn table having a disk loading portion and a central opening portion arranged to allow a disk to be attached thereto and removed therefrom, a rotor concentric with a rotation axis of the turn table, the rotor including a rotor holder having therein a rotor magnet and a cylindrical portion arranged to retain on an outer circumferential surface thereof the rotor magnet, and a stator having an armature arranged to oppose an outer circumferential surface of the rotor magnet via a gap therebetween. The turn table is affixed in an axial direction on an upper portion of the rotor holder, and the disk loading portion is arranged radially outside the cylindrical portion of the rotor holder. A disk loading surface of the disk loading portion is arranged to make contact with the disk, and a bottom portion of the disk loading portion is arranged axially below an area where the turn table and the rotor holder make contact with one another. The disk loading portion has a predetermined thickness in the axial direction, thereby preventing a deformation of the disk loading portion even when the disk is placed thereupon.

16 Claims, 10 Drawing Sheets

DISK DRIVE DEVICE HAVING A MOTOR, AND MANUFACTURING METHOD OF THE MOTOR

BACKGROUND OF THE INVENTION

1. Field of the Invention

The present invention relates to an inner rotor type motor, and more particularly, to a motor having a turntable loaded thereon to which a disk is attached and from which the disk is removed, and to a manufacturing method of the motor. Also, the present invention relates to a disk drive device including the motor.

2. Description of the Related Art

Recently, there is an increased demand for a disk driving device used for driving an optical disk (e.g., CD and/or DVD) to become smaller in size and dimension, and to become portable. The optical disk, however, has a large diameter and is not suited for portable uses. Therefore, in order to achieve portability of the disk driving device, a portable terminal device, or a disk driving device, compatible with an optical disk having a reduced diameter is in demand.

Conventionally, an outer rotor type brushless motor such as one shown in FIG. 9 is used for the disk driving device.

However, as shown in FIG. 9, in the conventional outer rotor type brushless motor, a mechanism (hereinafter, referred to as a "rotor holder retaining mechanism 1") for preventing a rotor holder 2 from coming off from the motor when a disk (not shown in FIG. 9) is removed therefrom is provided on a bottom end surface of the rotor holder 2. Due to such a configuration, the rotor holder retaining mechanism 1 prevents the brushless motor from having a reduced thickness. Further, a disk loading surface 3 which is a component separately provided on the motor may have, as a result of an assembly error or the like, a rotation axis that is not concentric with the rest of the motor.

Also, since the conventional outer rotor type brushless motor has a configuration in which the rotor holder 2 covers an armature 4, a restriction is imposed on a range of a motion of an optical pickup 2.

SUMMARY OF THE INVENTION

In order to overcome the problems described above, preferred embodiments of the present invention provide a brushless motor having a reduced thickness and having a center axis which is not offset from the center axis of the disk.

A motor according to a preferred embodiment of the present invention is an inner rotor type motor which includes a rotor including therein a rotor magnet having a predetermined center axis as a rotation axis, and a rotor holder for retaining the rotor magnet, and a stator including therein an armature which is positioned opposing to an outer circumferential surface of the rotor magnet. A turn table for allowing a disk to be attached thereto and removed therefrom is affixed at an upper portion of the rotor holder.

The turn table includes a disk loading portion having a disk loading surface on which the disk will be placed. A bottom portion of the disk loading portion is arranged axially lower than a portion at which the turn table and the rotor holder make contact with one another. By virtue of this configuration, the disk loading portion will have a predetermined thickness in the axial direction, thereby preventing a deformation of the disk loading portion even when the disk is placed thereupon. In particular, the axial thickness (e.g., distance between a bottom facing surface and a top surface) of the disk loading portion is to be, preferably, at least about 0.5 mm.

The rotor holder of the motor according to the present preferred embodiment includes a cylindrical portion which retains the rotor magnet by the outer circumferential surface of the rotor magnet, and an outwardly extending portion which extends outwardly in a radial direction from a lower portion in the axial direction of the cylindrical portion. The outwardly extending portion radially extends such that a portion of the armature is axially on top of an outermost portion of the outwardly extending portion. By virtue of this configuration, when the rotor moves upwardly in the axial direction, the portion of the armature will prevent the outwardly extending portion from moving further upwardly.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
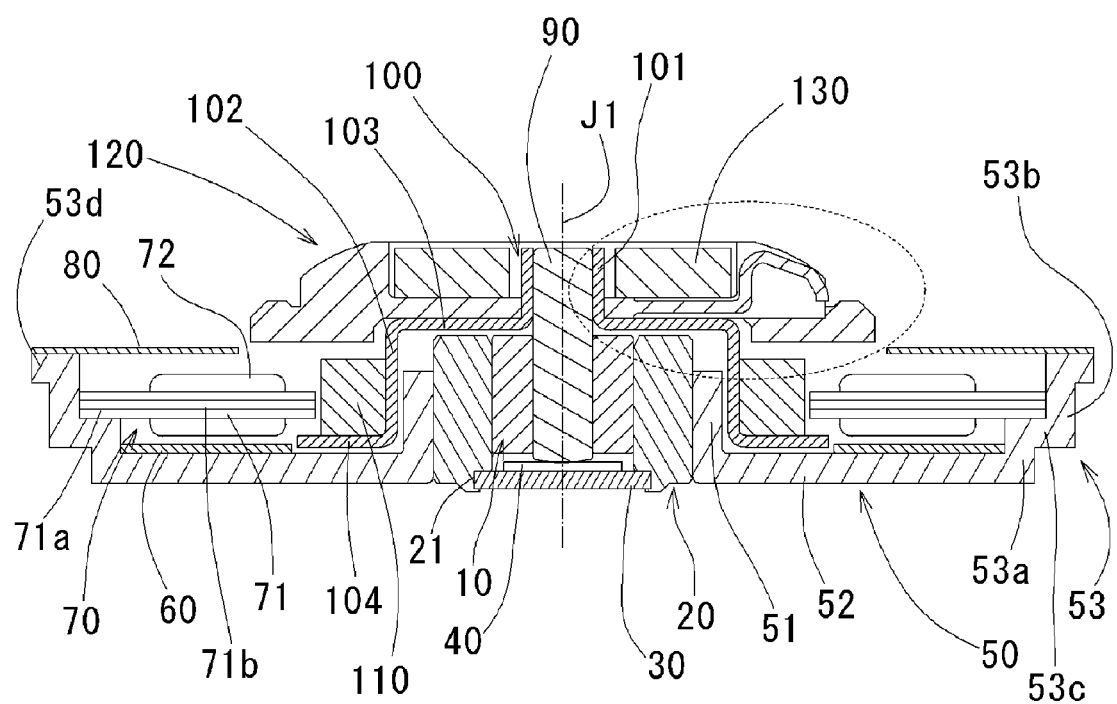
FIG. 1 is a schematic cross sectional view in the axial direction of a first preferred embodiment of a motor according to the present invention.

Hereinafter, an entire structure of a first preferred embodiment of a brushless motor according to the present invention will be described with reference to FIG. 1. FIG. 1 is a diagram showing a cross sectional view, in an axial direction, of the brushless motor.

A sleeve 10 is a cylindrically shaped bearing made of a sintered material impregnated with oil. A housing 20 for retaining the sleeve 10 therein by an inner circumferential surface of the housing 20 is provided on an outer circumferential surface of the sleeve 10. The housing 20 is constructed such that a lower portion thereof extends below the bottom surface of the sleeve 10. Below the housing 20, an enlarged inner diameter portion 21 is provided. A plate 30 for sealing the inner circumferential side of the sleeve 10 and that of the housing 20 is provided at an inner circumferential surface of the enlarged inner diameter portion 21. A disk shaped thrust plate 40 which is made of a material having superior abrasion resistance while allowing an object to easily slide thereon is provided on a top surface of the plate 30.

A cylindrically shaped base 50 which has a bottom portion and is preferably made of a steel plate by a method such as a deformation process (e.g., press fit, etc.) is provided on the outer circumferential surface of the housing 20. A housing retaining cylindrical portion 51 is provided at a portion of the base 50 so as to retain the housing 20. A bottom surface portion 52 extends in a radially outward direction from the housing retaining cylindrical portion 51. A cylindrical portion 53 which has, depending on the axial portion thereof, two different diameters is provided on an outer circumferential edge of the bottom surface portion 52. Also, a circuit board 60 having an annular shape or an arc shape is provided on an outer circumferential side of a top surface of the bottom surface portion 52.

The cylindrical portion 53 of the housing 20 has at the outer circumferential edge thereof an inner cylindrical portion 53a which extends upward in the axial direction, and an outer cylindrical portion 53b which extends, in a continuous manner, radially from the inner cylindrical portion 53a in an outward direction. A base step portion 53c is provided at a portion of the cylindrical portion 53 bordering between the inner cylindrical portion 53a and the outer cylindrical portion 53b. An armature 70 is provided at an inner circumferential portion of the base step portion 53c and at an inner circumferential surface of the outer cylindrical portion 53b. The aforementioned inner circumferential surfaces each make contact with the armature 70.

The armature 70 is preferably formed by winding a coil around a stator core 71 which includes a plurality (three in the current preferred embodiment) of thin magnetic steel plates laminated on top of one another. The coil is preferably formed by a wire 72 so as to conduct electricity. The stator core 71 includes an arc shaped or an annular shaped core back portion 71a, and a plurality of tooth portions 71b each protruding inwardly from the inner circumferential edge of the core back portion 71a to the central axis J1 (indicated by an alternate long and short dash line). Each tooth portion 71b is wound by the wire 72. A notched area may be provided in the armature 70 in order to allow an optical pickup (not shown in FIG. 1) to move radially closer to the center axis J1 than the core back portion 71a. By virtue of this configuration, the optical pickup will be allowed to move in the radial direction closer to the center axis J1, thereby effectively utilizing the capacity of the disk. Note that an optical pickup having a rotating arm arranged at a portion radially outside of the armature 70 may be provided to substitute for the notched area.

An extending portion 53d which extends outwardly in the radial direction is provided on a top end surface of the outer cylindrical portion 53b. An arc shaped or an annular shaped cover 80 which covers the armature 70 is provided on a top surface of the extending portion 53d. The cover 80 is preferably formed of a thin plate by a method such as a deformation process (e.g., press fit, etc.) in order to provide a brushless motor having a reduced thickness.

A shaft 90 is inserted through a space defined by the inner circumferential surface of the sleeve 10 until the shaft 90 reaches the thrust plate 40. The shaft 90 is rotatably supported by the inner circumferential surface of the sleeve 10 so as to rotate about the rotation axis.

A rotary holder 100 which has a substantially cylindrical shape and a cover is provided at an upper portion of the shaft 90. At the portion where the rotor holder 100 and the shaft 90 are affixed to one another, a substantially cylindrically shaped shaft attaching portion 101 is provided. A cylindrical portion 102 is provided at a radially outer side of the shaft attaching portion 101 so as to surround a periphery of the sleeve 10, housing 20, and the housing retaining cylindrical portion 51. A cover surface portion 103 is arranged so as to connect the shaft attaching portion 101 and the cylindrical portion 102. Also, an outwardly extending portion 104 which extends outwardly in the radial direction is provided at a lower portion of the cylindrical portion 102. The rotor holder 100 is preferably formed by a method such as press fitting, or any other suitable method.

A rotor magnet 110 which generates a rotary driving force is affixed on an outer circumferential surface of the cylindrical portion 102 of the rotor holder 100. An outer circumferential surface of the rotor magnet 110 and an inner circumferential surface of the tooth portion 71b are opposed, via a gap therebetween, to one another in a radial direction.

Also, on the top surface of the cover surface portion 103, a turn table device 120 is provided to which a disk (not shown in FIG. 1) is attached thereto and removed therefrom.

When an electric current is supplied to the wire 72 from an external power source, a magnetic field is generated surrounding the wire 72. Due to an interaction between the magnetic field and the rotor magnet 110, the driving force will be generated.

Figure 2:
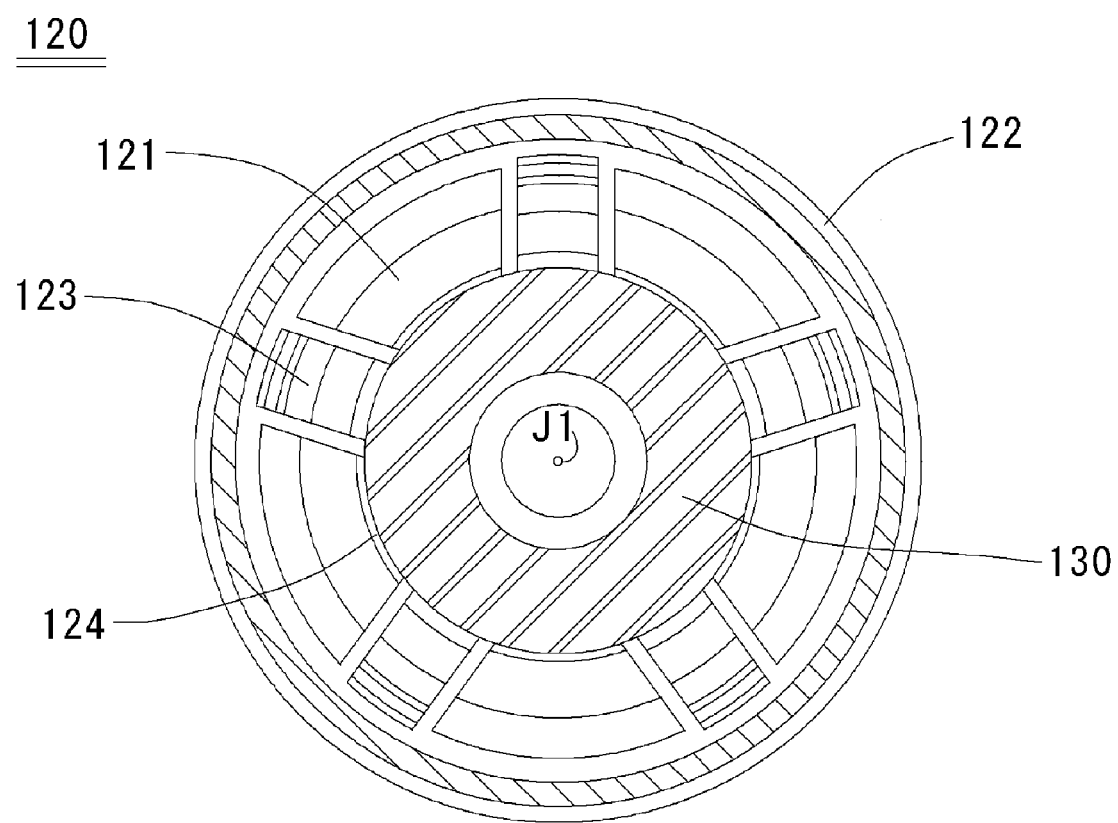
FIG. 2 is a top view of a turn table of a preferred embodiment of the present invention.
Figure 3:
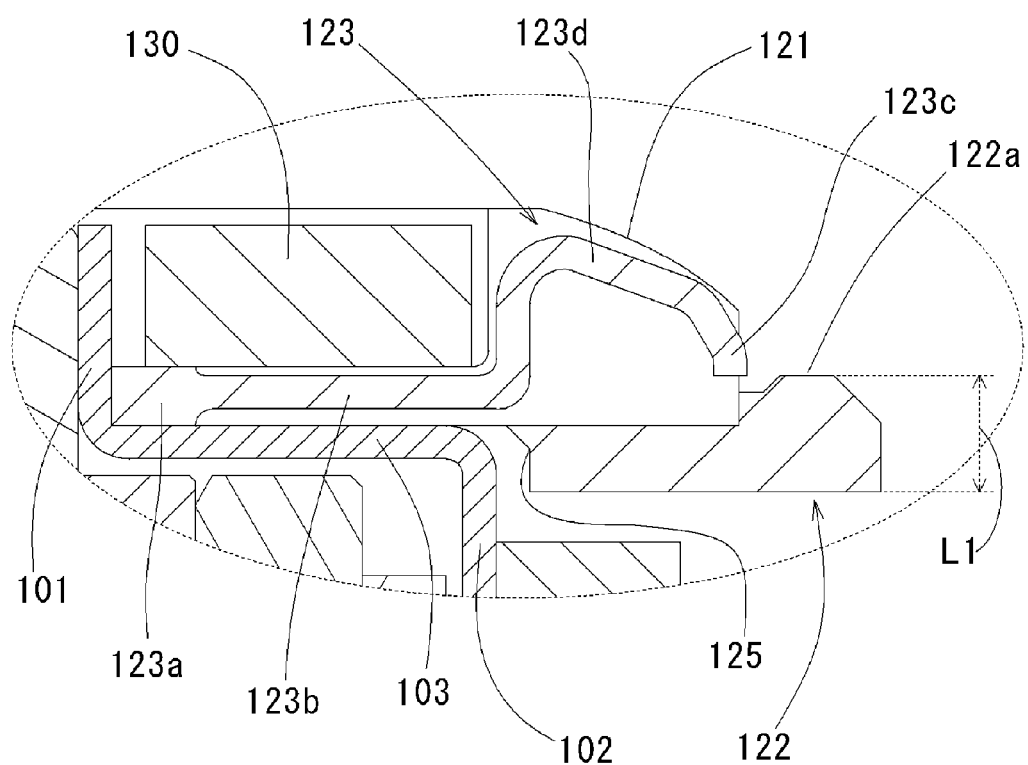
FIG. 3 is an enlarged view of a portion circled by a dotted line in FIG. 1.
Figure 4:
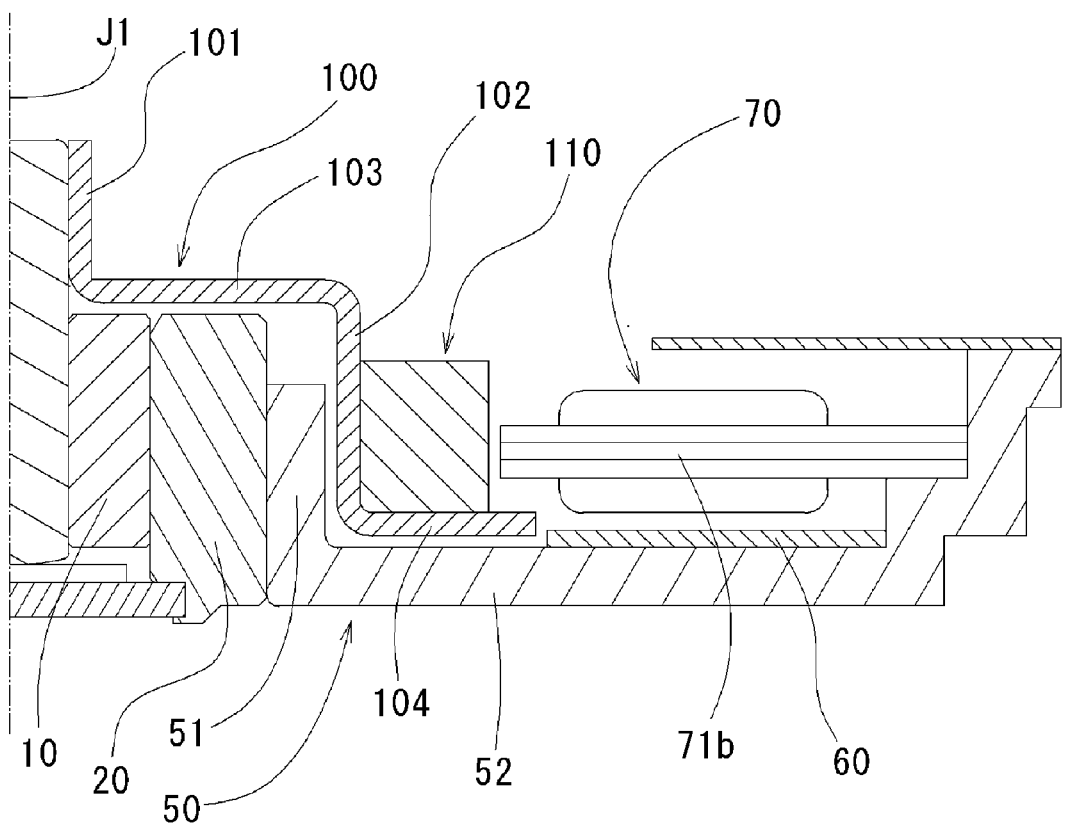
FIG. 4 is a diagram showing a positional relation between a rotor holder and an armature of a preferred embodiment of the present invention.
Figure 5A:
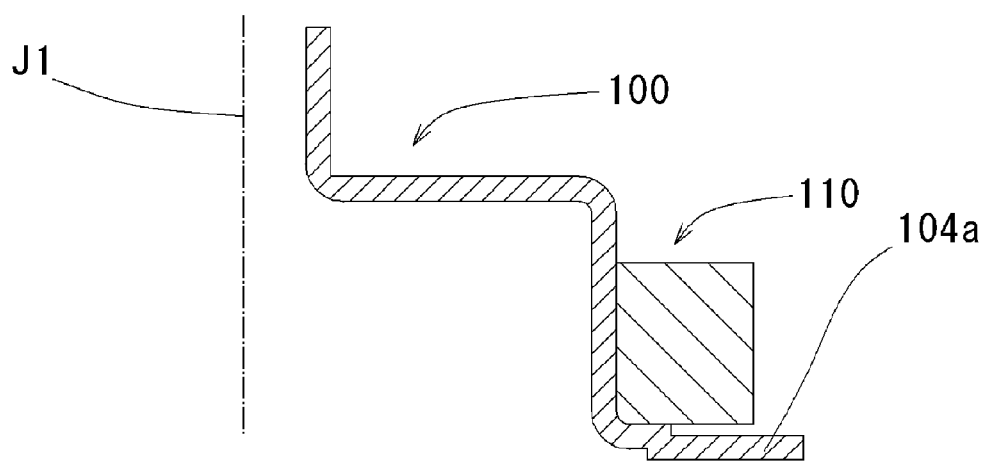
FIG. 5A and FIG. 5B each are a diagram showing a preferred embodiment of the rotor holder.
Figure 5B:
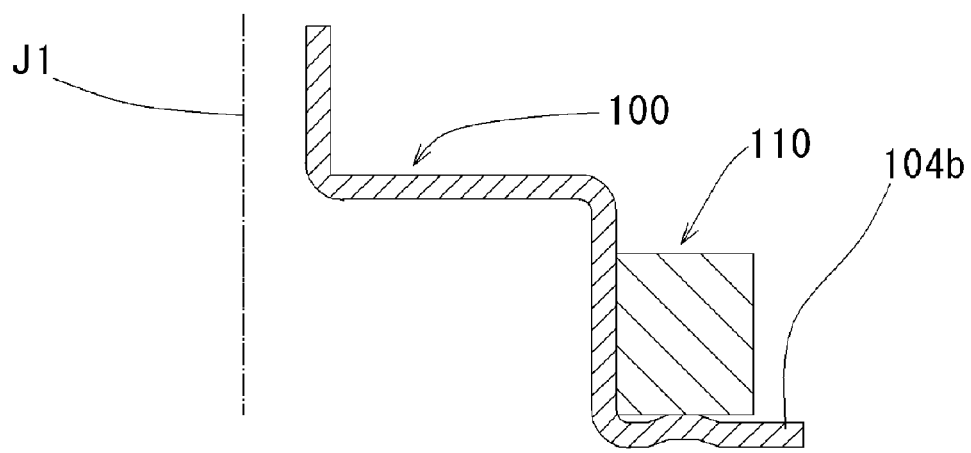

Next, the principal elements of the brushless motor which allow the motor to have a reduced thickness will be described with reference to FIGS. 2 to 5B. FIG. 2 is a diagram showing a top view of the turn table device 120. FIG. 3 is an enlarged view of a portion circled by a dotted line shown in FIG. 1. FIG. 4 is a diagram showing the connection between the rotor holder 4 and the armature 70. Note that the turn table device 120 is omitted from FIG. 4. FIG. 5A and FIG. 5B each show a preferred embodiment of the rotor holder 100.

Turn Table Device

According to FIG. 2, the turn table device 120 includes a plurality of arc shaped guiding portions 121 which guide a disk to the turn table device so as to align a rotational center of the disk with the rotation axis, a disk loading portion 122 which makes contact with a bottom surface of the disk so as to load the disk thereon, and a plurality (five in the current preferred embodiment) of claw portions 123 which coaxially retain the disk on the turn table device 120. The plurality of guiding portions 121 are arranged to have a predetermined distance therebetween in the circumferential direction. Between each guiding portion 121, one of the claw portions is provided. A ring shaped or an annular shaped indent portion 124 is provided at a portion radially inward of the guiding portion 121. An annular shaped clamp magnet 130 is affixed inside the indent portion 124.

Next, the claw portion 123 will be described with reference to FIG. 3. The claw portion 123 includes at a radially innermost portion thereof a base portion 123a which makes contact with the shaft attaching portion 101, an arm portion 123b which extends radially outwardly from the base portion 123a, a disk aligning portion 123c which protrudes further outwardly in the radial direction than the guiding portion 121 and makes contact with an outer circumferential edge which defines an opening of the disk (not shown in FIG. 3) so as to align the disk with the rotation axis; and a substantially "C" shaped connection portion 123d which connects the arm portion 123b with the disk aligning portion 123c. A gap is formed between the top surface of the cover surface portion 103 and the arm portion 123b. By virtue of this configuration, the disk aligning portion 123c will be allowed to move in the axial direction when loading the disk thereon. Further, the disk aligning portion 123c will be allowed to move elastically in the inwardly radial direction. As a result, the disk can be loaded on the turn table device 120 in a well-aligned manner.

Also, the disk loading portion 122 for loading the disk thereon is provided at a portion radially outward of the guiding portion 121. On the top surface of the disk loading portion 122, a disk loading surface 122*a* which makes contact with a bottom facing surface of the disk is provided. The disk loading portion 122 is designed to have a predetermined thickness in the axial direction, and therefore, the bottom facing surface of the disk loading portion 122 will be located axially below the top surface of the cover surface portion 103. By virtue of this configuration, the disk loading portion 122 will have durability to withstand a disk loading force applied when the disk is loaded thereon. Consequently, the disk loading portion 122 will be able to prevent deformation thereof when loading the disk thereon. Also, in order to increase the durability of the disk loading portion 122, the disk loading portion 122 maximally utilizes a space in the radial direction between the cylindrical portion 102 of the rotor holder 100 and the cover 80. By virtue of this configuration, a step portion 125 will be provided at a bottom facing surface of the guiding portion 121. In particular, when a disk having an external diameter of about 28 mm and a thickness of about 0.6 mm is to be loaded on the turn table device 120, a thickness L1 between the bottom facing surface of the disk loading portion 122 and a top end surface of the disk loading surface 122*a* is preferably greater than about 0.5 mm. Since the step portion 125 is provided, that is, the bottom facing surface of the disk loading portion 122 is located axially below the top surface of the cover surface portion 103, the brushless motor having loaded thereon the turn table device 120 can be designed to have a reduced thickness.

Also, the turn table device 120, except for the clamp magnet 130, is preferably formed by a process such as resin or plastic molding in an integral manner. When a disk loading portion is provided to the turn table device 120 in a conventional manner in which the disk loading portion is a separate component, an assembly error may cause misalignment between the disk and the turn table device 120. Due to the misalignment, a rotation axis of the disk will not be stabilized thereby causing an error such as a recording error. However, when the guiding portion 121, the disk loading portion 122, and the claw portions 123 are provided in the integral manner as a single component to the turn table device 120, the aforementioned misalignment can be prevented. By this configuration, the disk can be appropriately aligned with the turn table device 120.

Mechanism to Prevent the Inner Rotor from Coming Off from the Motor

Hereinafter, a relationship between the rotor holder 100 and the armature 70 will be described with reference to FIG. 4.

The rotor magnet 110 which is affixed to the cylindrical portion 102 of the rotor holder 100 makes contact with the outwardly extending portion 104 which has an annular shape. By virtue of this configuration, an axial position of the rotor magnet 110 will be determined easily, and a leakage of magnetic flux to the base 50 from the rotor magnet 110 will be prevented. Consequently, magnetic flux generated by the rotor magnet 110 will be supplied efficiently to the armature 70, thereby improving magnetic efficiency of the brushless motor.

Figure 9:
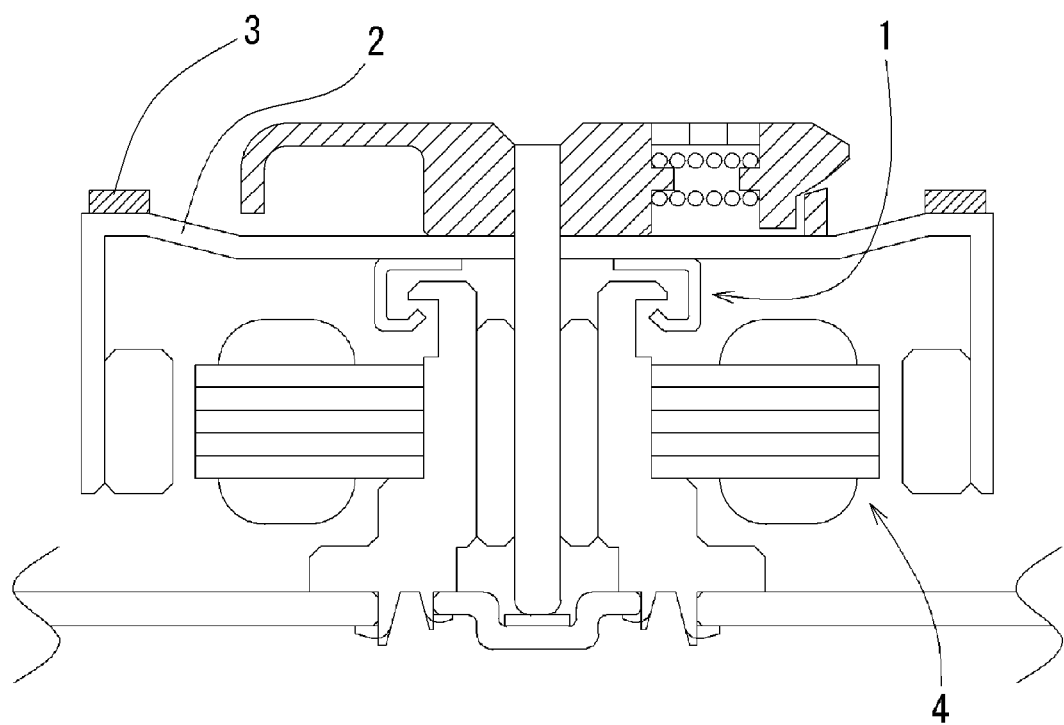
FIG. 9 is a cross sectional view in the axial direction of a conventional motor.

Also, the outwardly extending portion 104 is arranged axially below the tooth portion 71*b* of the armature 70, and extends radially outward farther than an innermost portion of the tooth portion 71*b*. By virtue of this configuration, a mechanism to prevent the inner rotor from coming off from the motor is provided. That is, when the rotor holder 100 moves upward in the axial direction, the top surface thereof will make contact with the bottom surface of the tooth portion 71*b*, thereby preventing the rotor holder 100 from further moving upward. Note that the outwardly extending portion 104 has at least one portion thereof extending outwardly in the radial direction further than the innermost portion of the rotor magnet 110. By virtue of the aforementioned mechanism, a conventional structure in which a latching portion 1 and a radial direction indent portion are provided so as to be engaged with each other will not be necessary. The latching portion 1 is provided on a bottom facing surface of the rotor holder 2 (see FIG. 9), and the radial direction indent portion is provided on a housing. The conventional structure in which the latching portion 1 is provided requires a large space in the axial direction. That is, the brushless motor having such configuration cannot achieve a reduced dimension and size as described above. According to the present preferred embodiment, the mechanism to prevent the inner rotor from coming off the motor requires only the axial space of the rotor holder 100, and therefore, the brushless motor according to the present preferred embodiment achieves the reduced size and dimension. Further, since the latching portion 1 will not be necessary, a number of elements required for the brushless motor according to the present preferred embodiment will be reduced. Thus, a brushless motor having a reduced thickness can be provided at a lower price.

Also, according to FIG. 5A, only an inner area of a bottom portion of the rotor magnet 110 makes contact with the outwardly extending portion 104*a*. Since a gap will be generated between the rotor magnet 110 and the surface of the outwardly extending portion 104*a* in the axial direction, the magnetic flux of the rotor magnet 110 will be prevented from being leaked to the outwardly extending portion 104*a*, thereby improving the magnetic efficiency of the brushless motor. According to FIG. 5B, only a central area, which is magnetically neutral, of the bottom portion of the rotor magnet 110 makes contact with an outwardly extending portion 104*b*.

Also, according to FIG. 4, the outwardly extending portion 104 and the circuit board 60 are not arranged overlapping one another in the axial direction. By virtue of this configuration, the brushless motor can have a reduced thickness in the axial direction as much as the axial thickness of the circuit board 60. Also, a gap will preferably be provided between the bottom facing surface of the outwardly extending portion 104 and the top surface of the base 50 in the axial direction; between the cylindrical portion 102 and the housing retaining cylindrical portion 51 in the radial direction; and between the top surface of the housing 20 and the top surface of the cover surface portion 103 in the axial direction. By virtue of this configuration, the aforementioned gaps configure a labyrinth structure preventing dust and the like from entering into the inner rotor, and the brushless motor according to the present preferred embodiment will have a reduced thickness and dimension. Also, the aforementioned configuration will prevent oil leakage from the sleeve to the outside of the motor. Therefore, a brushless motor which is highly reliable can be provided.

Manufacturing Method

Figure 6:
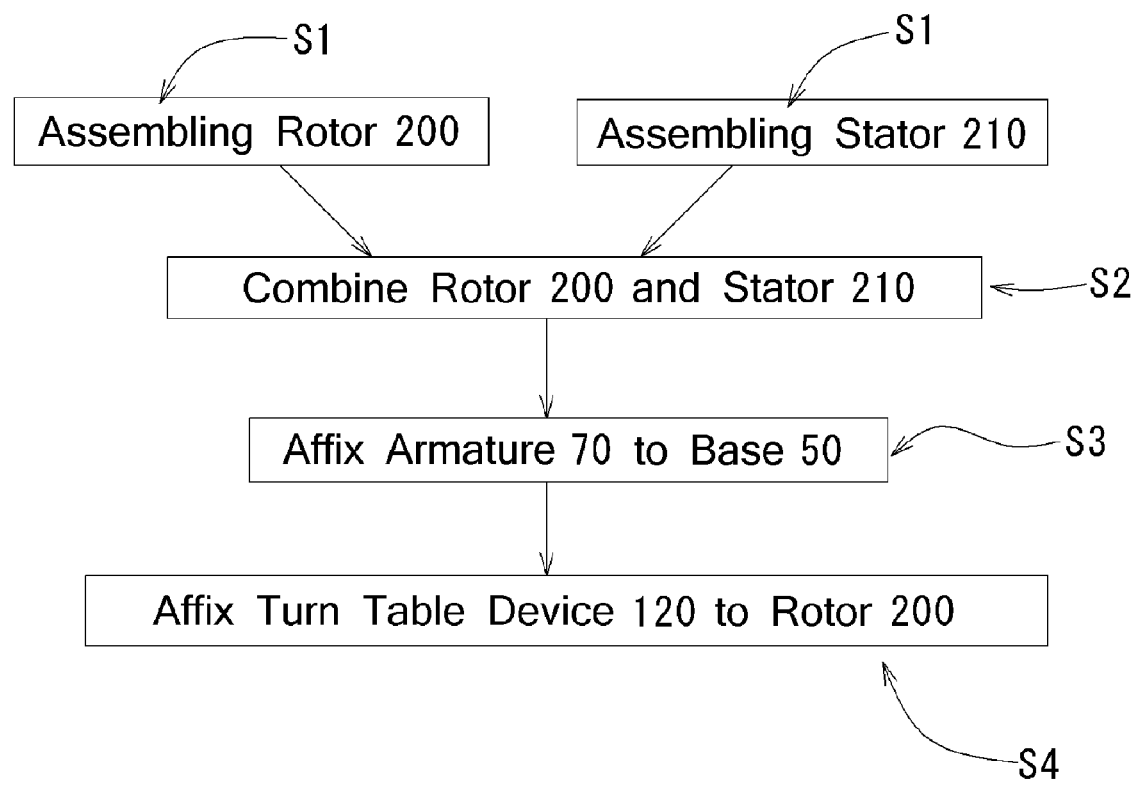
FIG. 6 is a flowchart illustrating a flow of steps of a manufacturing method of the motor according to a preferred embodiment of the present invention.

Next, a manufacturing method of the brushless motor according to a preferred embodiment will be described with reference to FIG. 6 and FIGS. 7A to 7D. FIG. 6 is a flowchart illustrating a flow of steps of a manufacturing method of the motor according to the present preferred embodiment. Each of FIGS. 7A through 7D is a diagram showing an assembly step for manufacturing the motor according to the present preferred embodiment.

Figure 7A:
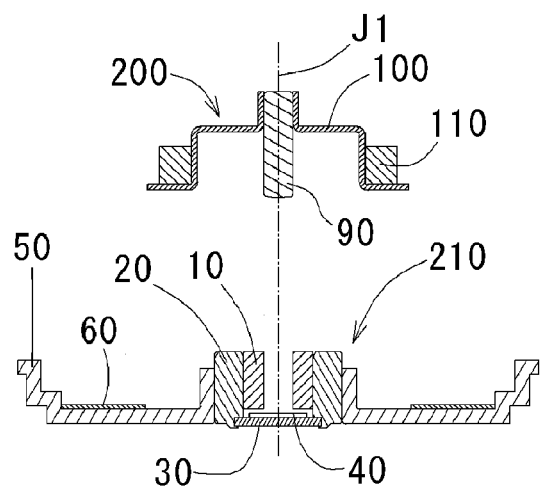
FIGS. 7A through 7D each are a diagram showing an assembly step for manufacturing the motor according to a preferred embodiment of the present invention.

According to FIGS. 6 and 7A, a rotor 200, having affixed thereon a rotor magnet 100, is attached to an upper portion of the shaft 90. Then, the circuit board 60 is affixed on the top surface portion 52 of the base 50 (Step S1 in FIG. 6). Also, a stator 210 in which the housing 20, the thrust plate 40, the plate 30, and the sleeve 10 are arranged at the inner circumferential surface of the housing retaining cylindrical portion 51 is provided (also, Step S1 in FIG. 6).

Figure 7B:
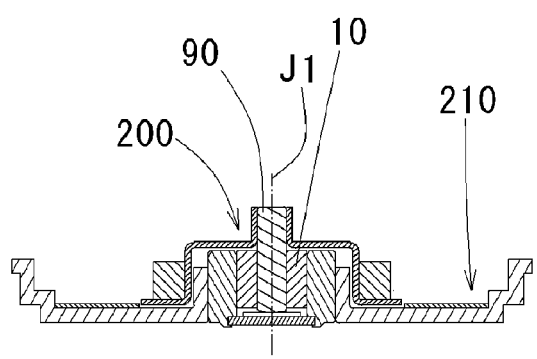

Next, according to FIG. 7B, the rotor 200 and the stator 210 are assembled with one another. That is, the shaft 90 is inserted through the sleeve 10 (Step S2 in FIG. 6).

Figure 7C:
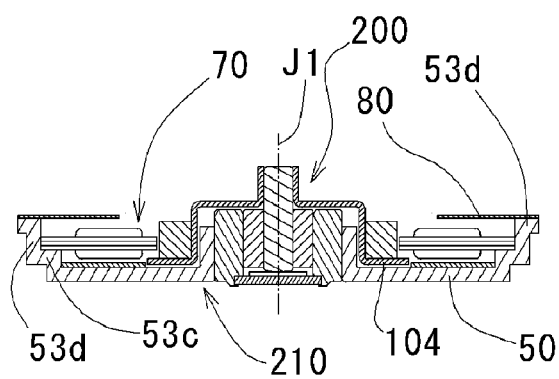

Next, according to FIG. 7C, the armature 70 is affixed to a portion of the base 50 on the top surface of the base step portion 53c and the inner circumferential surface of the outer cylindrical portion 53b (Step S3 in FIG. 6). The steps and configuration described above form the mechanism to prevent the inner rotor from coming off the motor. Then, the cover 80 is affixed to the top surface of the extending portion 53d. Note that the cover 80 can be affixed to the extending portion 53d at the end of the manufacturing method of the brushless motor.

Figure 7D:
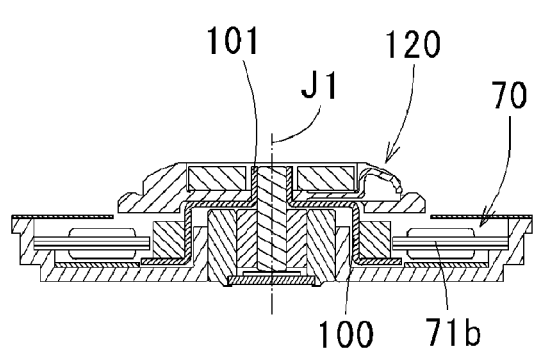

Finally, according to FIG. 7D, the turn table device 120 is affixed to an exterior surface of the shaft attaching portion 101 (Step S4 in FIG. 6). By virtue of this configuration, the turn table device 120 which extends outwardly in the radial direction further than the inner circumferential surface of the tooth portion 71b is provided.

Further, since the armature 70 is affixed to the base 50 after the rotor 200 and the stator 210 are assembled with one another, the outwardly extending portion 104 of the rotor holder 100 is arranged below the armature 70. By this configuration, outwardly extending portion 104 and the plurality of tooth portions 71b provide the mechanism preventing the inner rotor from coming off from the motor.

Disk Drive Device

Figure 10:
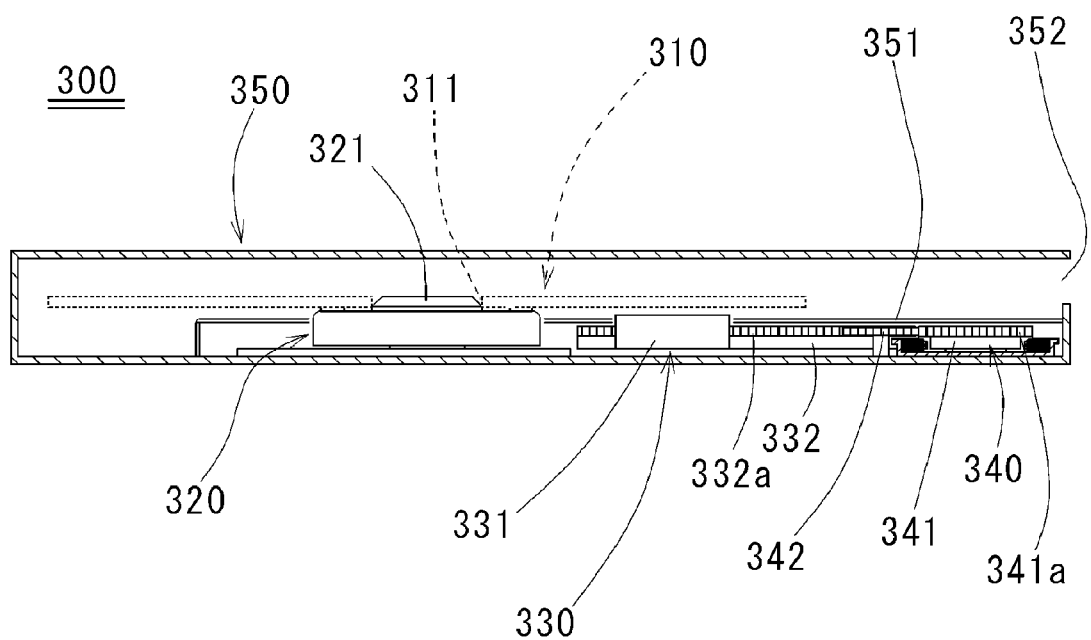
FIG. 10 is a schematic cross sectional view in the axial direction of a preferred embodiment of a disk driving device having the motor loaded thereon.

Another preferred embodiment of a disk drive device according to the present invention will be described with reference to FIG. 10. FIG. 10 is a schematic cross sectional view in the axial direction of the disk drive device.

According to FIG. 10, a disk drive device 300 includes a brushless motor 320 which rotates a disk 310 and includes a chucking device 321 for aligning the rotation axis of the disk 310 with that of the brushless motor 320, wherein the disk 310 has formed thereon a central opening 311 through which the chucking device 321 is inserted; a pickup unit 330 which records and reproduces information on the disk 310 by emitting laser beams to the disk 310; a gear unit 340 which moves the pickup unit 330 in the radial direction with respect to the disk 310; a disk transferring unit (not shown in FIG. 10) which takes therein and ejects therefrom the disk 310; and a housing 350 which contains therein the brushless motor 320, the pickup mechanism 330, the gear unit 340, and the disk transferring unit.

The gear unit 340 includes a motor 341, and a conduction reception gear 342 to which the rotary torque generated by the motor 341 is conducted.

Also, the housing 350 includes a barrier board 351 which borders the disk transferring unit and the gear unit 340. Also, the housing 350 provides an opening portion 352 through which the disk 310 is inserted and ejected.

The barrier board 351 is made of a thin plate and prevents grease from the gear unit 340 from getting onto the disk. As indicated above, the housing 350 has formed thereon an opening 352 through which the disk 310 is inserted and removed.

The pickup unit 330 includes a recording and reproducing portion 331 which emits the laser beams, and a transferring portion 332 which transfers the recording and reproducing portion 331 and is arranged vertically with respect to the direction the disk 310 is being transferred. The transferring portion 332 includes a meshed portion 332a which is in mesh with the conduction reception gear 342. The recording and reproducing portion 331 moves along with the transferring portion 332 in the radial direction.

The conduction reception gear 342 rotates since the conduction reception gear 342 and a gear portion 341a which is attached to the motor 341 are in mesh with one another. Also, the transferring portion 332 moves in the radial direction since the conduction reception gear 342 is in mesh with the meshed portion 332a of the transferring portion 332. Also, the recording and reproducing portion 331 moves in the radial direction along with the transferring portion 332.

While the present invention has been described in detail, the foregoing description is in all aspects illustrative and not restrictive. It is understood that numerous other modifications and variations can be devised without departing from the scope of the present invention.

For example, although the turn table device 120 according to the preferred embodiments described above retains the disk therein by using the clamp magnet 130, the present invention is not limited thereto. The turn table 120 may be a chucking device 140, as shown in FIG. 8, in which a clamp magnet 130 is not used.

Figure 8:
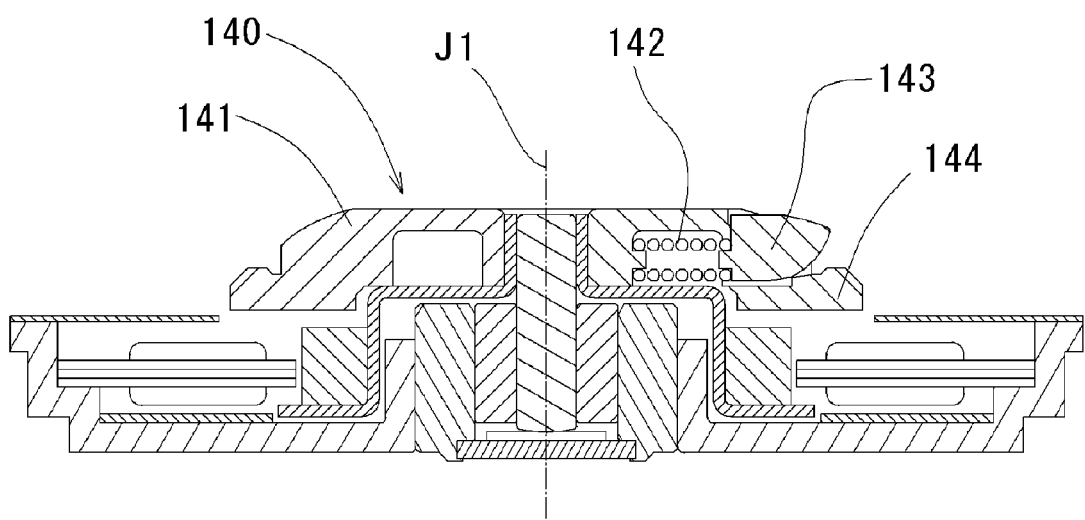
FIG. 8 is a schematic cross sectional view of another preferred embodiment of a motor according to the present invention.

The chucking device 140 according to FIG. 8 includes a centering case 141 which guides the disk to the center of the rotation axis thereof; an elastic member 142 (e.g., a "coil spring" as shown in FIG. 8) which applies a force in the radially outward direction to the central opening of the disk; a claw portion 143 which retains the disk; and a disk loading portion 144 which is formed integrally with the centering case 141, wherein the disk loading portion 144 is arranged further outside in the radial direction than the elastic member 142, and the claw portion 143 retains the disk by the outer circumferential edge of the central opening. By virtue of this configuration, a clamp magnet 130 is not required for the chucking device 140 to retain the disk.

Also, although three stator cores 71 are used according to the preferred embodiments described above, the present invention is not limited thereto. Also, although five claw portions 123 are provided according to the preferred embodiments described above to have a predetermined distance therebetween in the circumferential direction, one claw portion is operable to retain the disk.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A motor comprising:
    a turn table having a disk loading portion arranged to allow a disk having a central opening portion to be attached thereto and removed therefrom;
    a rotor concentric with a rotation axis of the turn table, the rotor including a rotor holder having therein a rotor magnet and a cylindrical portion arranged to retain on an outer circumferential surface thereof the rotor magnet; and a stator having a cylindrically shaped sleeve, and an armature opposed to an outer circumferential surface of the rotor magnet via a gap therebetween; wherein the turn table is affixed in an axial direction on an upper portion of the rotor holder, and the disk loading portion is arranged radially outside the cylindrical portion of the rotor holder; and a disk loading surface of the disk loading portion is arranged to make contact with the disk, and a bottom portion of the disk loading portion is arranged axially below an area where the turn table and the rotor holder make contact with one another.

2. The motor according to claim 1, wherein a distance in the axial direction between the bottom portion and the disk loading surface of the disk loading portion is greater than about 0.5 mm.

3. The motor according to claim 1, wherein the turn table includes:

a guiding portion arranged near the rotation axis so as to be, after the disk is loaded thereon, within the central opening portion of the disk so as to align the disk with the rotation axis of the turn table; and at least one claw portion arranged to push the central opening portion of the disk outwardly in a radial direction; wherein the disk loading portion, the guiding portion, and the at least one claw portion are made of a unitary piece of plastic material.

4. The motor according to claim 3, wherein a ring shaped or an arc shaped indent portion having an opening facing upward is provided at a portion radially inward of the guiding portion, and an annular shaped clamp magnet is provided inside the indent portion.

5. The motor according to claim 1, wherein the cylindrical portion of the rotor holder is arranged below the disk loading portion, has a diameter smaller than that of the disk loading portion, surrounds the sleeve, and has at a bottom portion thereof an outwardly extending portion extending outwardly in a radial direction.

6. The motor according to claim 5, wherein a bottom portion of the rotor magnet makes contact with a top surface of the outwardly extending portion.

7. The motor according to claim 5, wherein the rotor holder is made of metal by a press work.

8. The motor according to claim 7, further comprising a substantially cylindrically shaped shaft concentric with the rotation axis and rotating around the rotation axis, and a shaft attaching portion to which the shaft is attached to the rotor holder.

9. The motor according to claim 7, wherein the outwardly extending portion extends outwardly in the radial direction further than a radially outermost portion of the rotor magnet, and is arranged axially lower than the armature.

10. The motor according to claim 1, wherein the armature includes a core back having an annular shape, a plurality of tooth portions each protruding inwardly in a radial direction from the core back, and a coil formed around each tooth portion; wherein a base to which the core back is attached is arranged outwardly in the radial direction from the sleeve, and a circuit board is provided on a top surface of the base and radially outside of the outwardly extending portion.

11. The motor according to claim 10, wherein the base is a metal plate by a press work.

12. The motor according to claim 10, further comprising a housing on an outer circumferential side of the sleeve arranged to retain the sleeve therein, and a housing retaining cylindrical portion provided on the base and arranged to retain an outer circumferential surface of the housing, wherein a gap is provided between an outer circumferential surface of the housing retaining cylindrical portion and an inner circumferential surface of the rotor holder.

13. The motor according to claim 12, wherein a gap in the axial direction is provided between a top surface of the base and a bottom surface of the outwardly extending portion.

14. The motor according to claim 13, wherein the bottom surface of the outwardly extending portion is axially lower than a top surface of the circuit board.

15. A motor comprising:

a rotor having a rotation axis and including a rotor holder having therein a rotor magnet and a cylindrical portion arranged to retain on a circumferential surface thereof the rotor magnet; and a stator having an armature arranged to oppose an outer circumferential surface of the rotor magnet via a gap therebetween; wherein the rotor holder includes a cylindrical portion arranged to secure the rotor magnet, and an outwardly extending portion extending outwardly in a radial direction; and the outwardly extending portion extends further in the radial direction than a radially outermost portion of the rotor magnet, and is arranged axially lower than the armature.

16. A disk drive device including the motor according to claim 1, the disk drive device comprising:

an optical pickup arranged to record information on the disk and reproducing information on the disk;

a gear unit including a plurality of gears arranged to allow the optical pickup to move in a radial direction; and a housing arranged to accommodate the motor, the optical pickup, and the gear unit.

* * * * *